United States Patent
Blalock et al.

(10) Patent No.: US 7,675,618 B2
(45) Date of Patent: Mar. 9, 2010

(54) MULTIPLEXING SPECTROMETER

(75) Inventors: Todd Blalock, Penfield, NY (US); Christopher Cotton, Honeoye Falls, NY (US)

(73) Assignee: ASE Optics, Inc., Rochester, NY (US)

( * ) Notice: Subject to any disclaimer, the term of this patent is extended or adjusted under 35 U.S.C. 154(b) by 324 days.

(21) Appl. No.: 11/787,258

(22) Filed: Apr. 16, 2007

(65) Prior Publication Data

US 2008/0252885 A1 Oct. 16, 2008

(51) Int. Cl.
G01J 3/28 (2006.01)
(52) U.S. Cl. .......................... 356/328; 385/12
(58) Field of Classification Search ................. 356/328, 356/334; 385/12
See application file for complete search history.

(56) References Cited

U.S. PATENT DOCUMENTS

| | | | |
|---|---|---|---|
| 5,118,200 A | 6/1992 | Kirillov et al. | |
| 5,615,008 A * | 3/1997 | Stachelek | 356/301 |
| 5,862,273 A * | 1/1999 | Pelletier | 385/12 |
| 6,137,565 A | 10/2000 | Ecke et al. | |
| 6,353,476 B1 * | 3/2002 | Allen et al. | 356/301 |
| 6,462,329 B1 | 10/2002 | Davis | |
| 6,646,265 B2 | 11/2003 | Brown | |
| 6,698,920 B1 | 3/2004 | Maylotte et al. | |
| 6,788,835 B2 | 9/2004 | Moslehi et al. | |
| 6,895,132 B2 | 5/2005 | Moslehi et al. | |
| 7,084,974 B1 | 8/2006 | Barwicz et al. | |
| 7,126,755 B2 | 10/2006 | Moon et al. | |
| 7,130,041 B2 | 10/2006 | Bouzid et al. | |
| 7,327,454 B2 * | 2/2008 | Cunningham et al. | 356/326 |
| 2005/0075704 A1 * | 4/2005 | Tu et al. | 607/88 |
| 2005/0213870 A1 * | 9/2005 | Kersey et al. | 385/13 |
| 2008/0204747 A1 * | 8/2008 | Emmerson et al. | 356/328 |

OTHER PUBLICATIONS

Vess et al., "Near-Visible Raman Instrumentation for Remote Multi-Point Process Monitoring Using Optical Fibers and Optical Multiplexing", 1992, SPIE vol. 1637, pp. 118-125.*

* cited by examiner

Primary Examiner—Kara E Geisel
(74) Attorney, Agent, or Firm—Patent Innovations LLC; John M Hammond

(57) ABSTRACT

A multiplexing spectrometer measures at least one parameter, such as temperature, pressure or stress. The system multiplexes the outputs of Bragg stack sensors deposited at the distant ends of optical fibers brought in contact or in close proximity to objects. The spectrometer detects the peaks of the optical signals returned from the Bragg stacks and converts them into corresponding values of the parameters of interest. The spectrometer includes an optical system that comprises an entrance slit, a diffraction grating as a light dispersing means. Multiplexing occurs on a two-dimensional solid state matrix photo detector detects and converts the light signals returned from the Bragg stack sensing elements into corresponding electrical signals, and a built-in look-up table to provides the values of the parameters of interest that correspond the spectral characteristics of the returned light signals.

15 Claims, 3 Drawing Sheets

MULTIPLEXING SPECTROMETER

FIELD OF THE INVENTION

This invention relates to a method and apparatus for optically sensing of physical parameters and particularly to a system having a plurality of multiplexed fiber optic sensors, which generate optical signals in response to changes in temperature, pressure or stress in objects being monitored.

BACKGROUND OF THE INVENTION

Many types of sensors acquire and transmit information using light signals in which the intensity of light and its spectral signature represent the magnitude and nature of the parameter being measured, the former by the maximum height of the peak of the energy in the spectrum, the latter by the location of such peak. One convenient way to process such information from a single sensor and to convert it into its electrical equivalent is to use a spectrometer.

In many applications, however, a network of sensors is used to collect information from multiple locations on the objects or in the environment being monitored. While it is also possible to use currently available spectrometers as readout instruments to interrogate multiple sensors, such instruments can be complex, expensive and not capable of operating at an adequate speed.

The class of photonic sensors that increasingly find diverse applications for measuring and monitoring a variety of parameters are fiber optic sensors. Such devices are used to monitor amongst other parameters, temperature, pressure, stress, etc., in machinery, power generators, manufacturing processes, propulsion systems, and other applications.

PRIOR ART

U.S. Pat. No. 6,137,565, issued on Oct. 24, 2000 to Wolfgang Ecke et al. discloses a temperature measuring system employing a plurality of Bragg gratings responsive to temperature changes by returning light signals from the sensors, the peak of which indicates the value of the temperature being measured. The sensors are coupled via optical fibers to an interferometer or a spectrometer, with a linear photo detector, which converts these signals into the temperature readings. The optical system, because of its complexity, is expensive and, unlike the system described herein, requires the use of pre-selected fibers, a significant disadvantage. The use of a 2-D photo detector array in our invention and by providing for interchangeability of all sensors much simplifies the system and reduces its manufacturing cost.

U.S. Pat. No. 6,462,329, issued on Oct. 8, 2002 to Michael A. Davis et al describes a sensor of ambient temperature utilizing a Bragg grating used as a precision reference in testing thermistor temperature sensors. There are significant differences between this device and the subject of the present invention: Unlike the device claimed herein, the device per U.S. Pat. No. 6,462,329 is not designed for contact measurements of temperature. The Bragg grating sensor is encapsulated, rather than exposed directly to the source of heat. The heat to the Bragg grating is conducted from the ambient environment via metal leads to the sensor, while we claim the use of a Bragg stack on the distal end of a single fiber for direct sensing of temperature.

U.S. Pat. No. 6,659,640, issued on Dec. 9, 2003 to Anthony A. Ruffa, discloses a temperature measuring system that employs at least two Bragg gratings as sensors that have a particular coefficient of expansion vs. temperature responsive to a particular wavelength, which means that the sensors have to be pre-selected for specifically such parameter values. This procedure makes the system more expensive as compared to the present invention in which the temperature sensors only need to be within the spectral range needed to accommodate the expected variation of the temperature or other parameters of interest.

U.S. Pat. No. 6,788,835, issued on Sep. 7, 2004 to Besad Moslehi et al. describes a complex opto-electronic system that converts light signals returned from a pair of selected Bragg gratings into the corresponding values of temperature being measured. As in the case of U.S. Pat. No. 6,659,640, we believe that this approach is more expensive and unnecessarily complex.

U.S. Pat. No. 7,084,974, issued on Aug. 1, 2006 to Andrej Barwitz et al., claims a method for enhancing spectral information first using a low resolution diffraction grating followed by digital processing of the signals. The sensors are photoelectric rather than Bragg stacks as in our invention. The system is designed for analytical applications using a spectrometer, rather than for measurement of temperature, pressure and stress.

U.S. Pat. No. 7,126,755, issued to John A. Moon et al on Oct. 24, 2006 describes a spectrometer on a chip. Unlike the present invention, it uses a linear, rather than two-dimensional photo detector array to image the segments of the spectrum to predetermined cells on the array. Each cell in the array is assigned a numerical value, thus when a number of cells are illuminated by the segments of the spectrum generated by the diffraction grating, a unique code can be derived. Rather than directly indicate the measured parameter magnitude, the code is used to identify, sort, track, or verify a variety of materials based on that code.

U.S. Pat. No. 7,130,041, issued to Ahmed Bouzid et al on Oct. 31, 2006 for a method to implement the multispectral imaging function with increased speed, simplicity and performance. A two-dimensional photo detector array is used to receive a spectrum of light dispersed by a grating such that each segment of that spectrum is imaged on to a predetermined cell of the array. The electrical signals emanating from the illuminated cells in the array are combined to measure the optical energy within the bandwidth of the spectrum. Our invention does not combine the signals from the photo detector array, but rather uses the outputs to identify from which of a plurality of sensors the signal originates and what is the peak wavelength of such signal which corresponds to the magnitude of the parameter of interest. Furthermore, in the present system the initial sensing is done with fiber optic sensors that have Bragg stacks deposited on their distal ends, rather than photo electric detectors.

U.S. Pat. No. 5,118,200 issued to Dimitry M. Kiriov et al, on Jun. 2, 1992 claims a system for remote measurement of temperature in a process chamber. The measurement is implemented by measuring the band gap of the heated substrate of interest by comparing it with the continuous spectrum light from a light source. In our system temperature is measured by determining the shift of peak energy wavelength as a function of temperature or other parameters of interest.

U.S. Pat. No. 6,895,132 issued to Behzad Moslehi et al. for a system to measure strain using fiber optic sensors. In the claimed system the peak wave length is determined using symmetrical optical coupled fiber optic discriminators. Two channels each accept the spectral signals from sensors employing Bragg gratings. The optical energy in the two channels is compared. The result is related to the strain. In an alternate embodiment, tunable filters are used for wavelength discrimination. Our system does not employ discriminators of the type described in this patent, nor does it compare the outputs of the Bragg sensors.

U.S. Pat. No. 6,646,265 issued to Dale Marius Brown et al, describes a special spectrometer designed to measure the temperature of combustion flames. Two photo electric detectors are employed to compare the optical energy of different parts of the spectrum generated by the flame. In our system optical fibers with Bragg stack deposited on their distal ends function as detectors. We also claim a multiplexed network of Bragg sensors to allow parameter measurements in different parts of objects. The outputs of the sensors in the present invention are not compared, rather the shift of the peak wavelength related to the magnitude of the parameter being measured.

U.S. Pat. No. 6,698,920 issued to Donald Herbert Maylotte for a system designed to measure the temperature of the buckets in gas turbines. A plurality of detectors is employed that input their signals into a spectrometer. An optical switch is used to select the outputs of detectors placed in the line of sight. In our system also a plurality of sensors is used which are distributed to different location on the object to measure the parameters of interest. We specified that sensors in our system will be optical fibers with deposited Bragg stacks at their distal ends, such sensors responsive to changes of temperature, pressure or stress being monitored.

The Bragg stacks are structures of very thin layers of diffractive ceramic materials, each layer having a different refractive index, which function as very selective optical filters or wavelength selective retro reflectors that are capable of isolating the energy peak in a light spectrum and the position with respect to wavelength of that peak. A practical method to use fiber optics equipped with Bragg stacks is to transmit through the fiber excitation light of sufficient bandwidth and intensity to the Bragg stack at the distal end of the fiber and collect the reflected light returned through the same fiber. The reflected light is modified by the Bragg stack in that the energy peak is isolated in the spectrum, the location of the peak within the reflected spectrum being determined by the geometry of the Bragg stack.

One application of such sensors is in the measurement of temperature. The Bragg stack at the end of the optical fiber is brought in contact or in close vicinity to the object the temperature of which is of interest. In response to the heat the geometry of the Bragg stack changes in that the individual refracting layers expand or contract depending on the temperature. As a result the position of the energy peak is shifted with respect to wavelength. Each position correlates with a particular temperature, the value of which can be derived from an electronic look-up table. An example of one embodiment of such system is described in detail in WO 2005/017477 in International Patent Classification[1].

[1] Theodor Morse and Fei Luo, assigned to Boston University

The same type of sensors can be used to measure pressure and stress. In these applications the Bragg sensors at the end of optical fibers are exposed to physical forces resulting from pressure or stress in the objects being monitored, forces that change the geometry of the Bragg stack. If high accuracy of such measurements is important, separate sensor can be used to measure the temperature of the object and utilize that information to compensate the primary results.

Fiber optic sensors have many advantages over other types of sensors for measuring the same parameters:

Fiber optic sensors are lightweight, flexible, have a very small diameter, can be monitored from distances as long as several hundred meters, are rugged, take up little space and are easily installed.

Are relatively easy to multiplex using a single multiplexing spectrometer as readout.

Work reliably in harsh and/or high gravity environments.

Generate no electro-magnetic interference and are not affected by EMI

Provide very fast response.

Are more cost effective, especially in multiplexed networks

When such sensors are used to monitor performance of engines, the information so obtained may be used to ensure optimal engine performance, save fuel, extend useful life, and prevent catastrophic failures.

The fiber optic sensors, which may be used in the system of this invention, utilize Bragg stacks as the actual sensing elements at the distal ends of or within the fibers. The sensors of this type are particularly effective in networks that allow substantially simultaneous measurements and monitoring of parameters of interest in several locations.

SUMMARY OF THE INVENTION

Briefly, in accordance with the present invention, a multiplexing spectrometer is provided by photonic sensors, and in particular with fiber optic sensors that incorporate Bragg stacks. These sensors are multiplexed to provide the spectrometer input.

A multiplexing spectrometer, in accordance with this invention, includes a dispersive and imaging means used to sequentially and rapidly interrogate fiber optic sensors and to direct the optical signals from a plurality of such sensors to a two-dimensional photo detector array. The signals from each of the fiber optic sensors in the network are directed, using a diffraction grating as a preferred embodiment, to a different cell row on the two-dimensional photo detector array, each such row having a fixed and known location. The fiber optic sensors have deposited on their distal ends Bragg stacks elements, which change their physical configuration in response to the changes in temperature, pressure or stress in the devices they are monitoring. A light source generates light of sufficient bandwidth to ensure adequate spectral range to accommodate the shifting of the peak response in the generated spectra due to magnitude-related changes of the parameters being measured. The light source supplies the input excitation for all of the fiber optic sensors by dividing the light into a corresponding number of beams, which are directed through optical fibers into the individual sensors. The Bragg stacks function as variable filters that reflect the light back into the fibers. The reflected light has an energy peak, the spectral position of which depends on the current physical configuration of the Bragg stack, responsive to the magnitude of the parameter being monitored. The location of the peak varies as the magnitude of that parameter varies.

At the input to the spectrometer the individual fibers are fused into a vertical array; it is understood, however, that other orientations of the fused fiber array are possible. The output from this fiber array is projected within the spectrometer on to a two-dimensional multi-cell photo detector array, such that the light from each fiber within the fiber array is projected onto one of predetermined cell rows within the photo array, which provide horizontal space on the photo array for the spectral signatures of the information coming from the sensors. Thus, the read-out spectrometer determines the position and the magnitude of the energy peak within the reflected light spectrum, converts the light signals into corresponding electrical signals, and displays the corresponding instantaneous magnitude of a parameter of interest as well as the location of the specific sensor generating the information.

Features of the multiplexing spectrometer, in accordance with the inventors, are the lack of moving components, fewer components, lower manufacturing cost, and a compact package that lends itself to miniaturization. Other important feature is that all fiber optic sensors with Bragg stacks can be substantially identical, i.e., respond to the changes of parameters by shifting the position of the peak wavelength by the same amount and thus ensure that the light signals are imaged on the same locations on the matrix detector located in the multiplexing spectrometer. Also, the same sensors, in addition to temperature, can be used for pressure and stress measurements,

DESCRIPTION OF THE PREFERRED EMBODIMENTS

Figure 1:
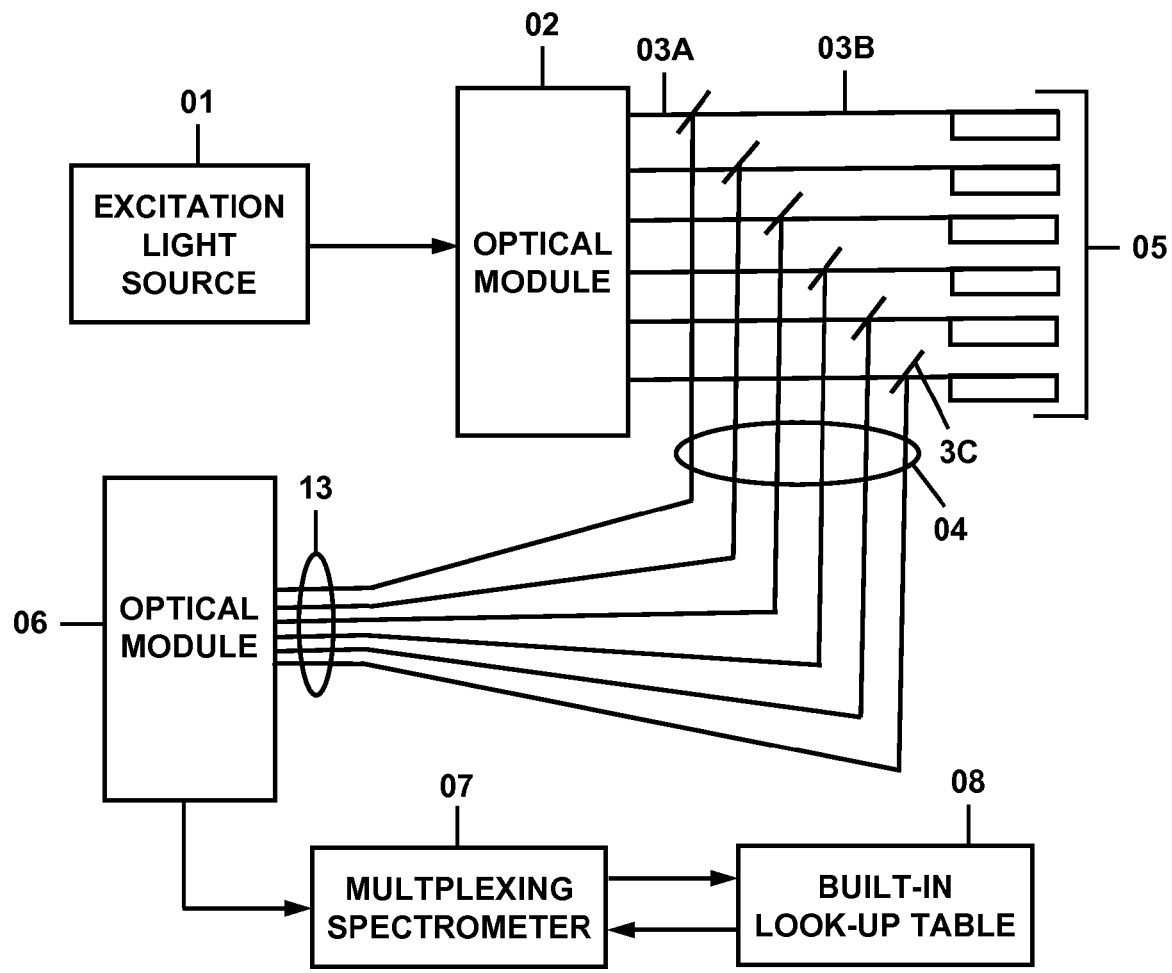
FIG. 1 in a block diagram illustrates the excitation light source and a method for distribution of light to the individual fiber optic sensors.

Referring now to FIG. 1, which depicts as a block diagram the excitation light source (01) preferably being a solid state device such as a light emitting diode (LED) or super luminous light emitting diode (SLED). Compared to more conventional light sources such as incandescent lamps, the LEDs and SLEDs have the advantages of much longer life, sufficiently wide bandwidth of the emitted light, require much less power, operate of a low voltage power supply, and allow very efficient coupling into the optical fibers. In addition, because of their small size, such devices facilitate miniaturization. The light source is connected to a power supply, of the type familiar to those skilled in the art that compensates for undesirable fluctuations in the intensity of light of these light sources.

The optical module (02) serves to divide the incoming light into as many channels as there are Bragg stack sensors; the block diagram shows six sensors, but it is understood that the number of sensors that can be used in the network, is limited only by the magnitude of the light output of the light source and by the input configuration of the spectrometer. From the module (02) the light is directed through the fiber array (03A), through a set 50/50 beam splitters (03C) and through the fiber array (03B) to the Bragg sensors (05).

Figure 2:
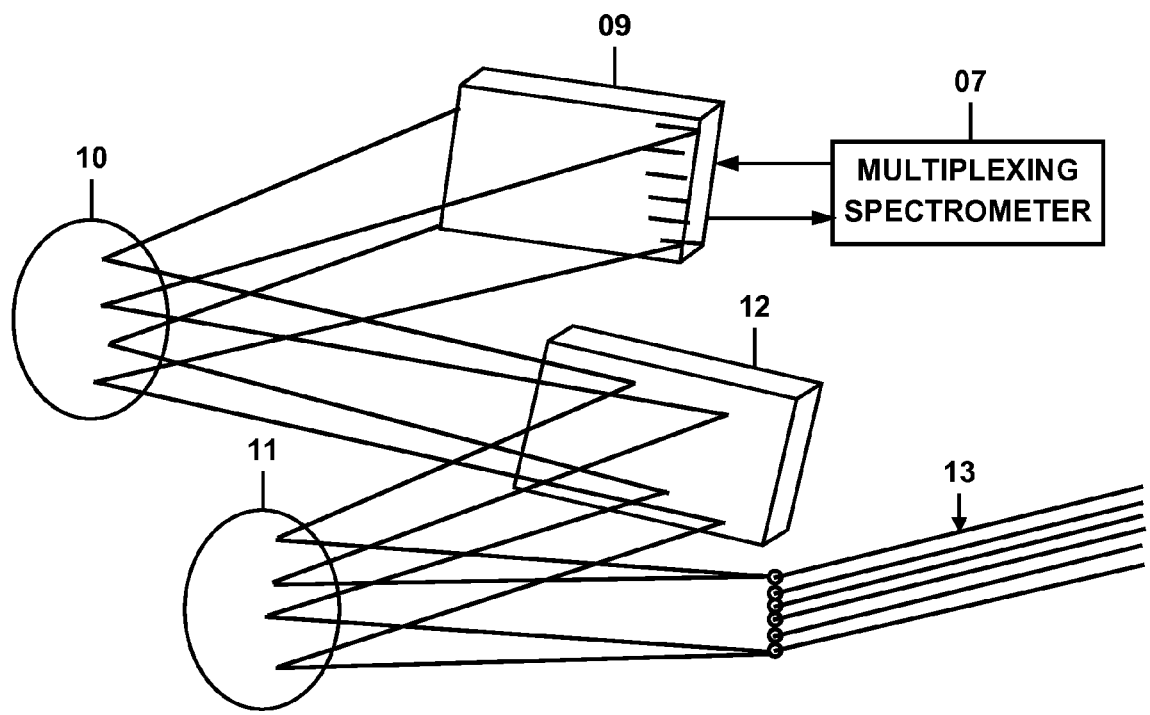
FIG. 2 in a schematic diagram depicts the optical and detection system of the multiplexing spectrometer.

The light signals returned from the Bragg sensors (05) through the fibers (03B) arrive at the beam splitters (03C) and are directed by the beam splitters (3C) through the array of optical fibers (04) to the optical module (06), which is shown in more detail in FIG. 2, The individual fibers (04) bringing the light signals from the sensors (05), are fused to form a vertical array (13). The image of this array (13) is projected by mirror (11) on a diffraction grating (12). The resulting spectrally and spatially dispersed signal is imaged by the mirror (10) onto the two-dimensional photo sensor array, which converts the light signals to the corresponding electrical signals. These data are then input into the electronics of the multiplexing spectrometer (07), which includes an alphanumeric display. Module (08) stores the data on defined locations on the photo detector (09) that correspond specifically to the individual Bragg stack sensors (05).

FIG. 2 illustrates a typical monochromator familiar to those skilled in the art, the purpose of which is to isolate the peak of light energy within the spectrum and to direct the light to the two-dimensional matrix photo detector array (09). Such array can comprise one of the many types of solid state detectors available today, for example, Charge Coupled Devices (CCD), Charge Injection Devices (CID), Complimentary Metal Oxide Semiconductors (CMOS), Avalanche Diodes, and others. The choice of a particular type is determined by the spectral response of the photo detector (09), as well as its sensitivity, resolution, size, and cost. One of the major criteria for the choice is the best response match for the spectral output of the light source (01). The monochromator configuration shown in FIG. 2 is known as Czerny-Turner, but it is understood that other optical configurations could be used to achieve the same result. The optical fibers (04) are fused into a vertical array at the input to the multiplexed spectrometer (07) optically coupled to the monochromator depicted in FIG. 2. From there the light signals are imaged by the concave mirror (11) onto the diffraction grating (12).

The spectrum from each sensor (05), FIG. 1, occupies a different pre-selected position on the entrance slit (13). The diffraction grating (12) separates the light signals being imaged onto it by the concave mirror (11) and images the input slit on the surface of the two-dimensional photo detector array (09). The signals from each sensor (05) occupy one predetermined row on the photo detector array. The photo detector (09) is being constantly and rapidly scanned under control of the multiplexing spectrometer (07). The light signals are converted by the photo detector (09) into electrical signals. The multiplexing spectrometer (07) detects the spectral peaks of each of the electrical signals and their location on the photo detector array (09). Given this information, the multiplexing spectrometer uses a built-in look-up table (08) to determine which sensor (05) generates that light signal and its magnitude and converts that information into the corresponding values of the parameters being measured, such as temperature, pressure or stress.

Figure 3:
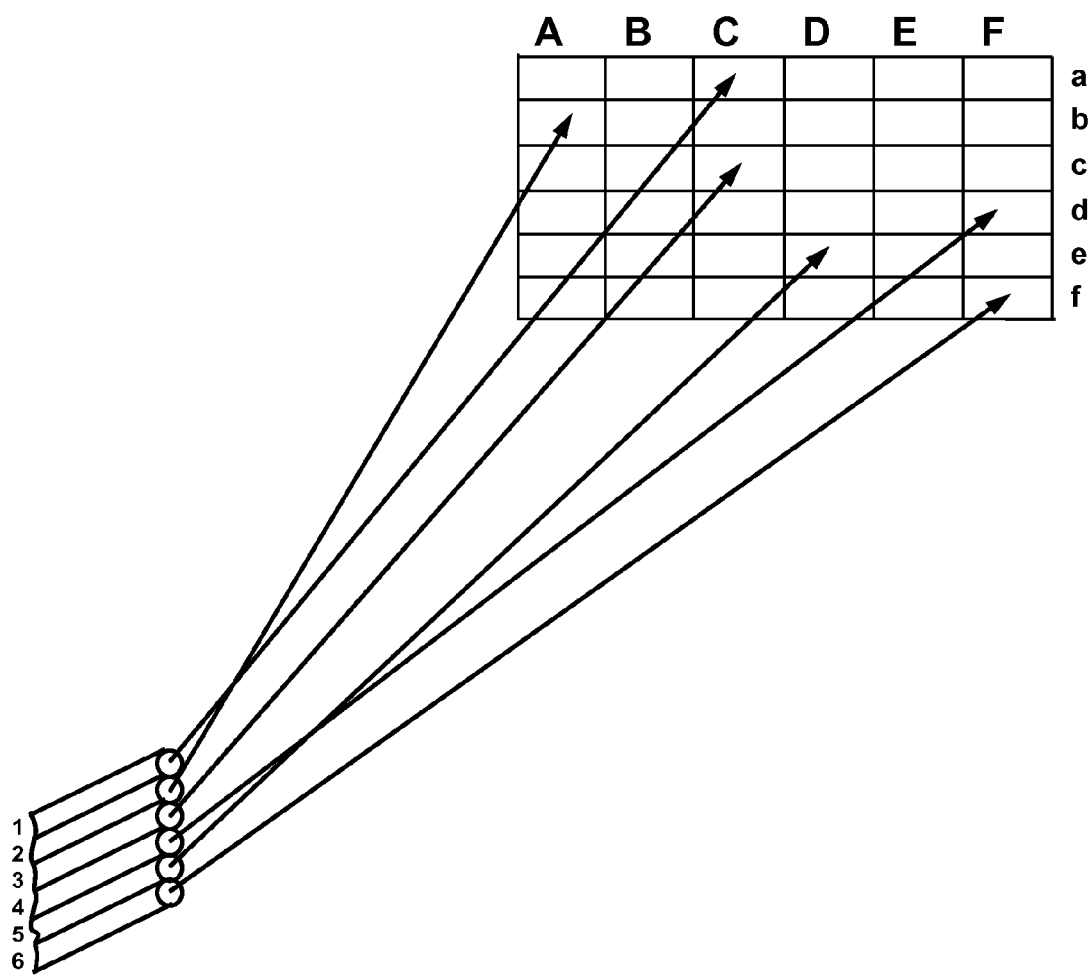
FIG. 3 in a diagram, which shows schematically the geometrical relation of the light output from the individual sensors with the cells of the two-dimensional photo detector array shown in FIGS. 1 & 2.

FIG. 3 further illustrates the relation of the Bragg stack sensors to the photo detector array. In this drawing all intermediary optical components have been omitted for the sake of clarity. The light signals from the fiber optic sensor (2) are directed to cell (Ab) in the matrix detector, meaning that magnitude of the parameter being measured at that location is high, corresponding to a shorter wavelength. The light signals from the fiber optic sensor (6) are directed to the cell (Ff) indicating lower energy and longer wavelength.

We claim:

1. A system for spectral analysis of parameters of an object, the system comprising sensing elements responsive to said parameters, optical fibers conducting light from a light source to and returning from said elements to provide a plurality of optical signals, a multiplexing imaging spectrometer including optics for multiplexing said optical signals by imaging said signals onto a two-dimensional photo detector array, and means responsive to the magnitude of said signals on predetermined locations on said photo detector array for measuring said parameters;

wherein said sensing elements are Bragg stacks deposited on the distal ends of said optical fibers and are either in direct contact with or are in close proximity of the object; and wherein all of said sensing elements are equipped with said Bragg stacks that have substantially identical structures resulting in substantially identical responses to variations in the magnitude and position of a wavelength peak.

2. A system in accordance with claim 1 in which all said sensors are substantially identical in their dimensions and operating parameters for interchangeability thereof.

3. A system in accordance with claim 1 in which said optical fibers are fused at the input to said spectrometer to form an entrance slit to said spectrometer.

4. A system in accordance with claim 1 in which said spectrometer includes a spatially and spectrally dispersing means.

5. A system in accordance with claim 4 in which said spatially and spectrally dispersive means are selected from a reflecting diffraction grating, a transmission diffraction grating, and an optical prism.

6. The system of claim 1 wherein said light source generates output radiation of sufficient magnitude to enable said sensing system to perform the desired measurements.

7. A system per claim 1 in which said light source is selected from the group consisting of:
   a light emitting diode,
   a super light emitting diode,
   a solid state diode laser,
   an incandescent lamp, and
   an ionized gas light source.

8. A sensing system in accordance with claim 4 comprising a power supply for said light source which compensates for undesirable fluctuations of light output.

9. A sensing system in accordance with claim 1 in which said photo detector array is composed of two-dimensional matrix of solid state photo detector elements that accept the light signals and converts them into corresponding electrical signals.

10. A system per claim 9 wherein said rows and columns of said photo detector elements accepts said light signals from only one of said sensors.

11. A photo detector array in accordance with claim 10 in which the location of said photo detector elements corresponds to the wavelength of said light signals that have the maximum energy within the particular segment of the spectrum imaged on said row of the photo detector elements.

12. A sensing system in accordance with claim 11 in which said elements of the solid state photo detector are selected from:
   charge-coupled devices,
   charge injection devices,
   complimentary metal oxide semiconductor devices, and
   avalanche diodes devices.

13. A sensing system in accordance with claim 1 in which said spectrometer is operative to detect the peak wavelength and the peak magnitude of said light signals.

14. A sensing system in accordance with claim 1 in which said spectrometer is selected from the group consisting of:
   a monochromator incorporating a diffraction grating, and
   an optical prism monochromator.

15. A sensing system in accordance with claim 1 in which a electronic look-up table is included as a reference for converting said peak the wavelength and magnitude of said light signals into the corresponding values of parameters of interest.

* * * * *